United States Patent
Mikell et al.

[11] Patent Number: 5,913,457
[45] Date of Patent: Jun. 22, 1999

[54] COMMODITY STORAGE AND RETRIEVAL MACHINE

[76] Inventors: Mary L. Mikell; Leander E. Mikell, both of 1683 Saunders Rd., Riverwoods, Ill. 60015

[21] Appl. No.: 08/754,281

[22] Filed: Nov. 20, 1996

[51] Int. Cl.⁶ .................................................. B65G 65/23
[52] U.S. Cl. ........................... 222/166; 141/381; 248/137
[58] Field of Search ................................. 222/164–166; 414/421; 248/133, 134, 136, 137, 138, 141, 142; 141/22, 379–381

[56] References Cited

U.S. PATENT DOCUMENTS

| | | | |
|---|---|---|---|
| 220,499 | 10/1879 | Seymour et al. | 248/137 |
| 222,764 | 12/1879 | Wilson | 248/137 |
| 272,512 | 2/1883 | Armstrong | 248/137 |
| 548,284 | 10/1895 | Atkinson et al. | 248/136 |
| 1,227,323 | 5/1917 | Russell | 248/137 |
| 1,385,712 | 7/1921 | Richey | 141/381 |
| 1,444,245 | 2/1923 | Hall | 248/137 X |
| 1,609,207 | 11/1926 | Schlabaugh | 248/136 |
| 1,791,005 | 2/1931 | Shepard | 248/142 |
| 1,796,190 | 3/1931 | Devlin | 141/381 |
| 1,839,729 | 1/1932 | Barels | 248/137 |
| 2,324,747 | 7/1943 | Weissert | 222/166 X |
| 2,554,875 | 5/1951 | Okunami | 248/141 |
| 2,605,071 | 7/1952 | Trepte | 248/142 X |
| 2,622,832 | 12/1952 | Hilferty | 248/137 |
| 2,665,098 | 1/1954 | Oden | 248/137 |
| 2,840,124 | 6/1958 | Greene | 141/381 |
| 2,842,167 | 7/1958 | Tupper | 141/381 |
| 3,167,205 | 1/1965 | Smith | 248/133 |
| 3,191,645 | 6/1965 | Dailey | 141/381 |
| 3,658,383 | 4/1972 | Sisson . | |
| 3,847,305 | 11/1974 | Tobin | 222/166 |
| 4,187,950 | 2/1980 | Peet | 222/166 X |

FOREIGN PATENT DOCUMENTS

| | | | |
|---|---|---|---|
| 161966 | 12/1953 | Australia | 248/141 |
| 708184 | 7/1931 | France | 141/381 |
| 1176351 | 4/1959 | France | 141/381 |

*Primary Examiner*—Kevin P. Shaver

[57] ABSTRACT

An apparatus used for the storage and retrieval of a commodity which includes a stand which is connected in a pivotal manner to, and suspends a cylindrical container. The container is enclosed with a removable top with a handle. The top when removed can act as a catching device for the commodities to be retrieved from the container. The container can be upended on its pivotal supporting stand for discharge of a portion of its contents into the top.

19 Claims, 8 Drawing Sheets

A.

B.

C.

ns the integrity of the design. The holes 16 are large enough to accommodate the fastening devices 14 but have enough clearance to allow the cylindrical storage container member 1 to pivot easily during discharge of its contents.

COMMODITY STORAGE AND RETRIEVAL MACHINE

SUMMARY OF THE INVENTION

This invention relates to a storage container, and more particularly to the container's shape, the container's supporting structure, the stand, and the container's top, catching device. Wherein, the container can be tilted and upended for discharge of the commodity into the top with minimum effort. Commodities such as charcoal, deicing salt, farm products and other commodities packaged in bulk quantities are commonly purchased (for economic considerations) and stored in paper or plastic bags, barrels, cans, boxes and buckets. The problems posed by the storage and retrieval of the bulk commodities include: First, storage location in relation to usage location Most often, the original packaging, once opened (or even closed), no longer affords reasonable protection from the environmental elements. The commodities, if still in their original packaging, must be sheltered and often such shelter is located away from the location of intended use, i.e. charcoal, salt, absorbents, etc., mostly packaged in paper, should not get wet and although primarily used outdoors they are often kept indoors or in a sheltered location often inconvenient to their use. Secondly, a major problem experienced in the use of commodities packaged in bulk form is the retrieval of the commodities. To retrieve most commodities packaged in bulk, the commodities must be poured (for each use) from the manufacturer's package or scooped from the manufacturer's package. When the bulk package is lifted for retrieval of the commodity, the user may experience stress on his or her lower back and the process can be messy, cumbersome and tiring. Scooping is also often difficult or impractical because of the shape of the commodity, e.g. charcoal does not facilitate scooping. In addition, the force required to insert a scoop and the strength required to remove the loaded scoop from the package can be excessive and straining, e.g. rock salt.

To remedy the problems described, this invention contemplates and incorporates:

(1) a water/moisture-resistant, tapered, cylindrical container for convenient storage; (2) a tapered top with a handle that not only covers the container and protects its contents but also acts as a catching device when accessing the commodities stored in the container; and (3) a structure, a stand, which pivotally suspends the container at designated pivotal points and facilitates the easy tilting of the container on the pivotal supports using the container's handle. Wherein, when tilted, the container's contents are poured into the top for subsequent use.

A principal object of the present invention is to provide a storage device which may be quickly and conveniently tilted and upended on its pivotal supporting structure for discharge of a portion of its contents into the top (catching device), eliminating the necessity of bodily lifting. This capability is provided through the simple manipulation or tilting of the container using its handle. Because of the nature of this invention, simplicity of design and limited number of parts, it may be adapted to many uses, is inexpensive to manufacture, simple to use, efficient and reduces physical effort. In addition, it provides the consumer with the ability to experience further cost savings achieved through the use of commodities purchased in bulk quantity.

Other objects and advantages of this invention will become apparent from the following descriptions taken in conjunction with the accompanying drawings, wherein are set forth by the way of illustrations and examples, certain embodiments of this invention.

IN THE DRAWINGS

DESCRIPTION OF THE ILLUSTRATIVE PREFERRED EMBODIMENT

Figure 1:
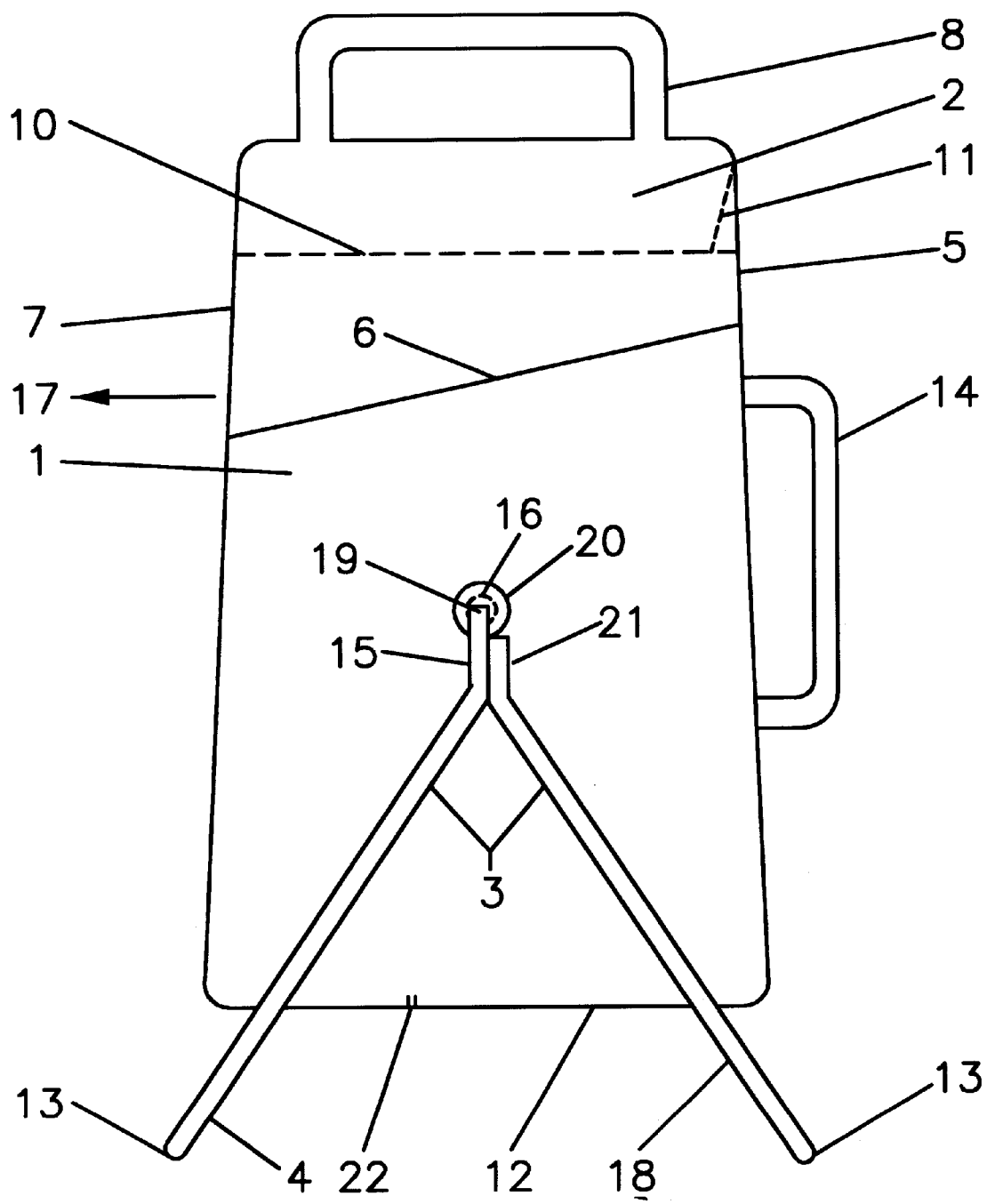
FIG. 1 is a side elevation view showing a cylindrical storage container member which is enclosed with a cylindrical top member, and being supported by a structural support, a stand member which has pivot arms which connect the stand member to the container member.
Figure 2:
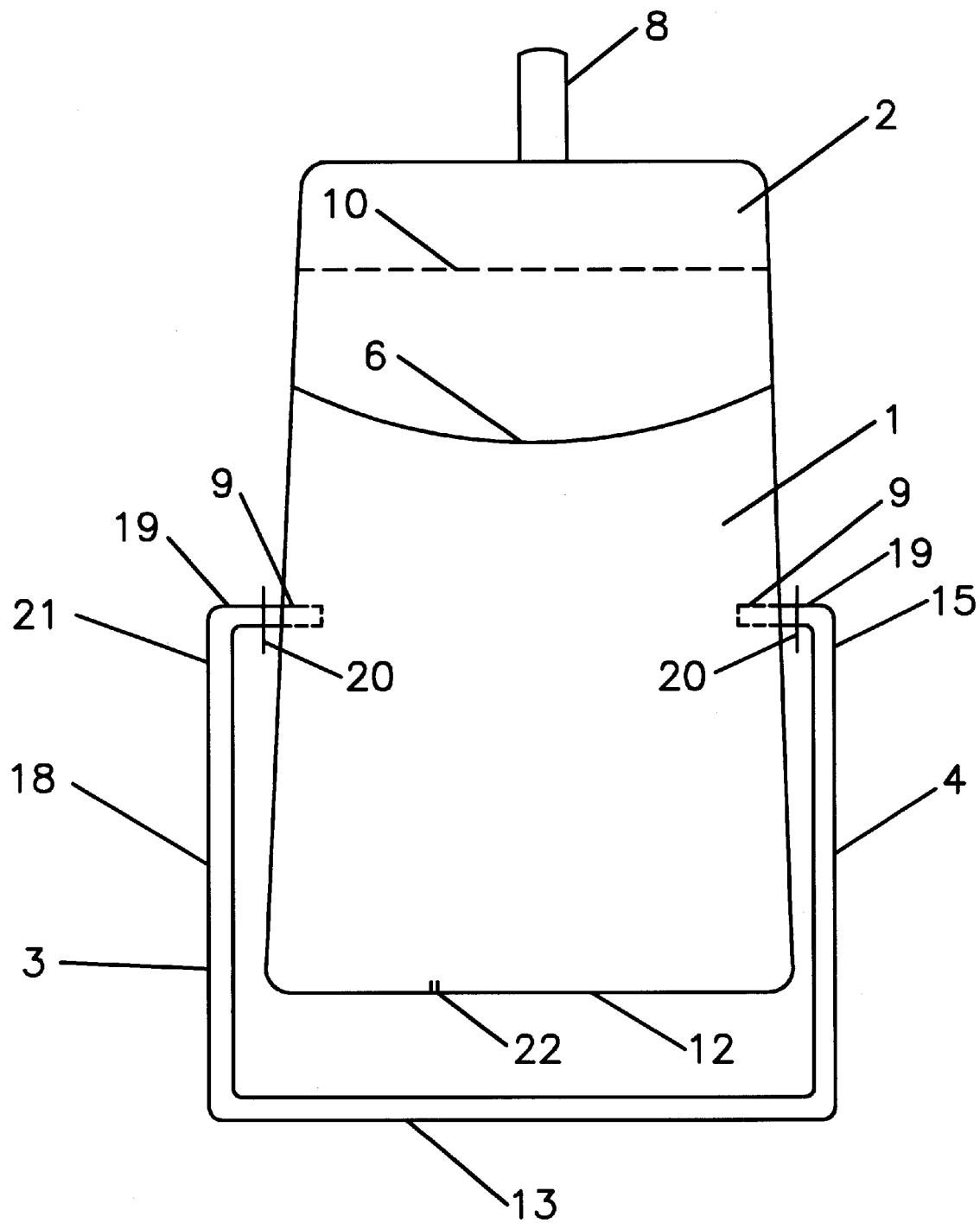
FIG. 2 is a front elevation view showing a cylindrical storage container member which is enclosed with a cylindrical top member, and being supported by a structural support, a stand member which has pivot arms which connect the stand member to the container member.

Referring to the drawings in more detail, the machine is made up of three primary members: mainly a cylindrical storage container member 1; a cylindrical top member 2, which also functions as a catching device; and the supporting structure, the stand member 3. See FIG. 1.

The embodied tapered design of both the cylindrical container member 1 and the cylindrical top member 2 provide for a fit with close tolerances for weather resistant qualities; and a lower center of gravity and increased stability for the invention. Also the open end 10 of the cylindrical container member 1 is smaller in diameter than the open end 6 of the cylindrical top member 2 contributing to a more controlled pouring ability. A stopping device 11 prevents the cylindrical top member 2 from locking onto the cylindrical storage container member 1. The cylindrical storage container member 1 and the cylindrical top member 2 may be constructed from a choice of materials dependent upon the application.

Figure 7A:
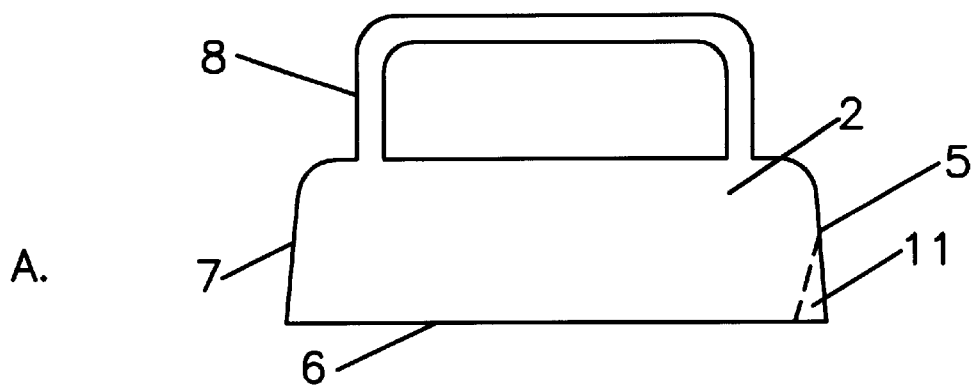
FIG. 7 is a side elevation view of three alternative types of cylindrical top members which may be used.
Figure 7B:
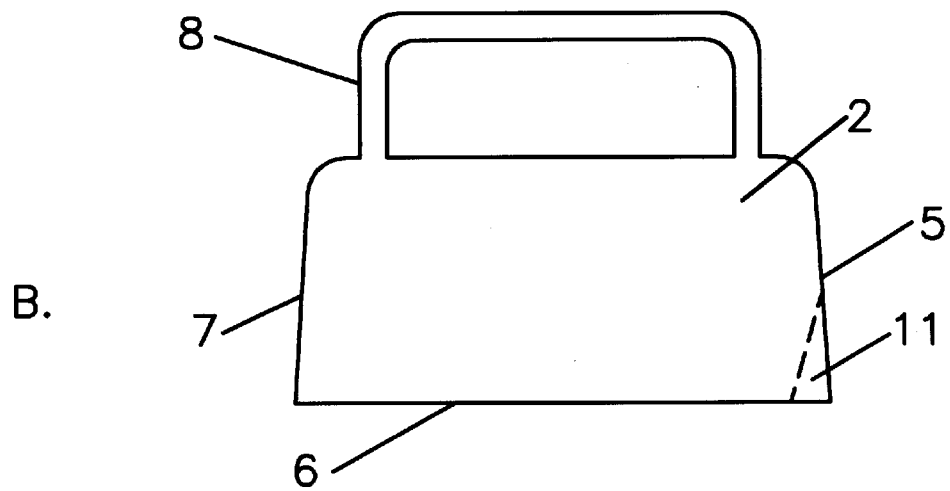
Figure 7C:
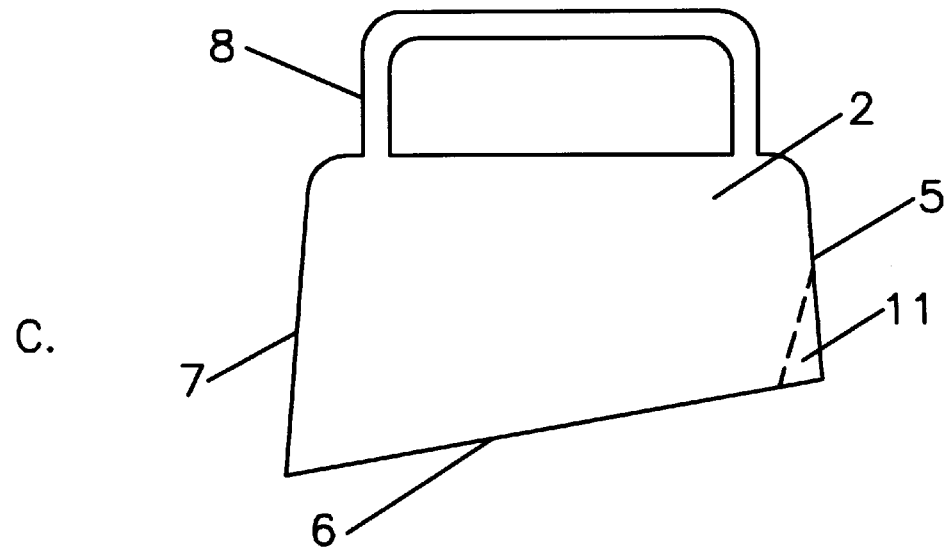
Figure 8:
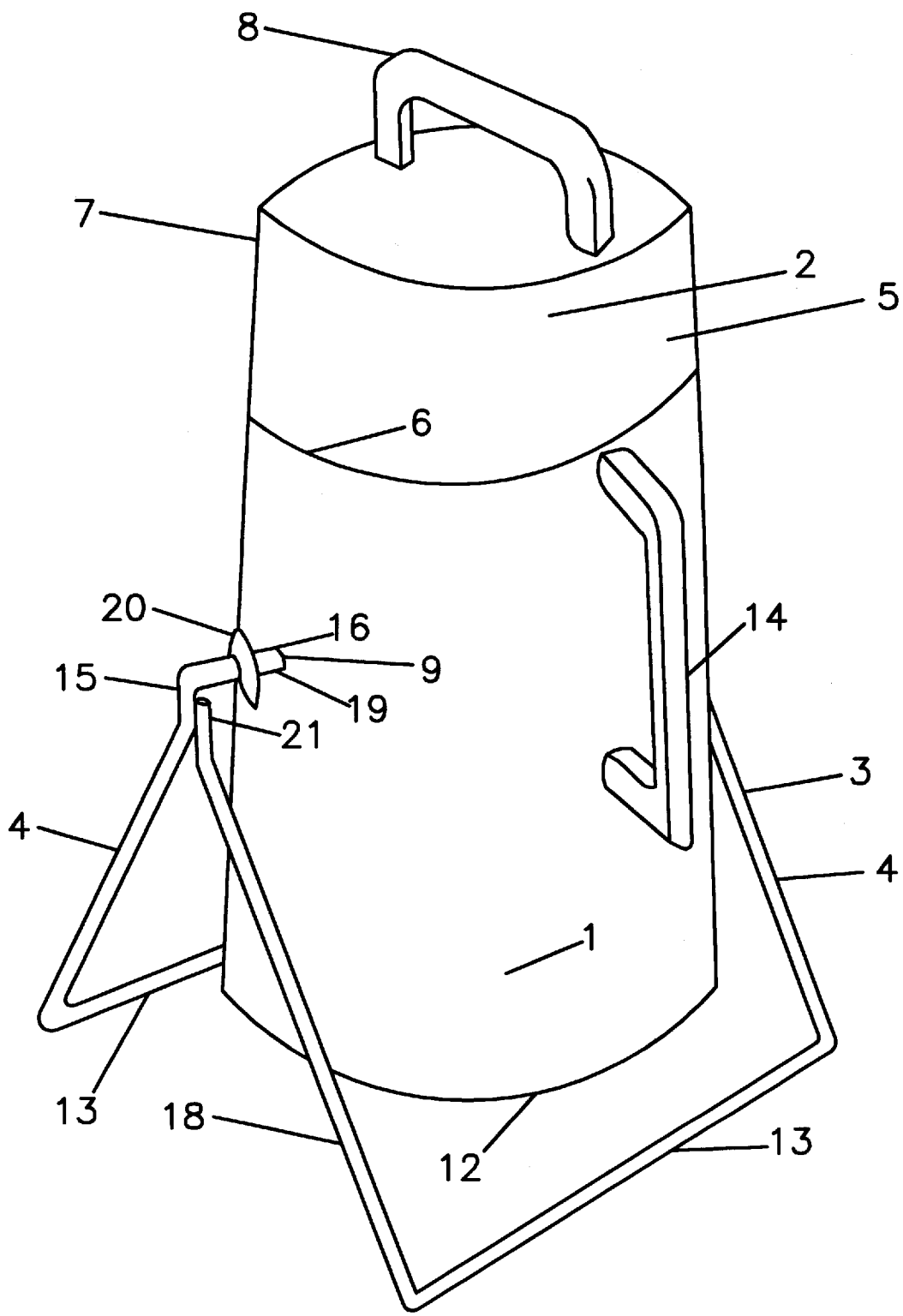
FIG. 8 is a perspective view of the invention.

The cylindrical top member 2 may be used as a lid only, FIG. 7A or may be used as both a lid and a catching device FIG. 7B and FIG. 7C to collect the materials being poured from the cylindrical storage container member 1.

Figure 3:
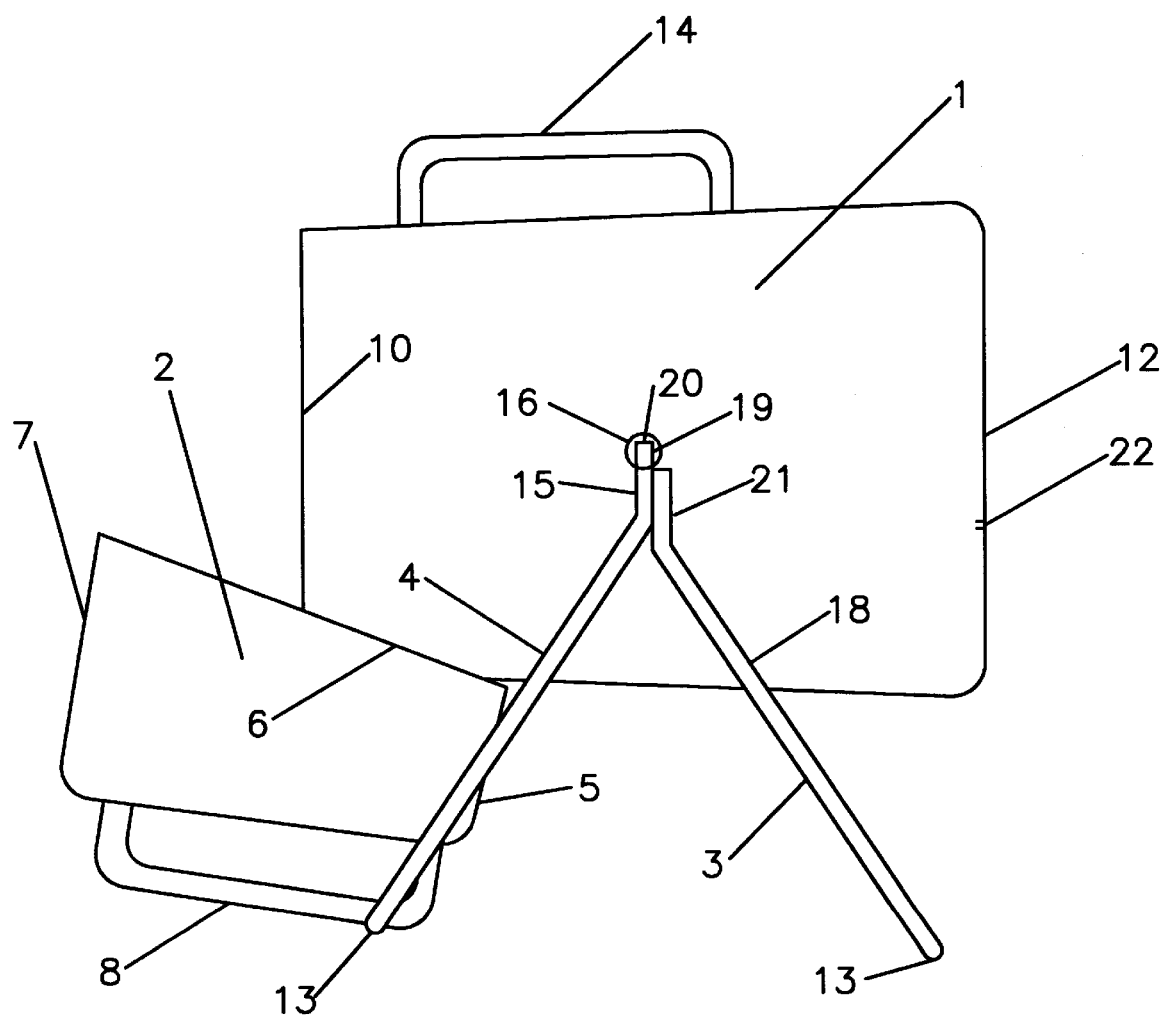
FIG. 3 is a side elevation view showing the apparatus in the tilted position with the top member positioned to act as a catching device for the commodities being poured from the cylindrical container member.
Figure 4A:
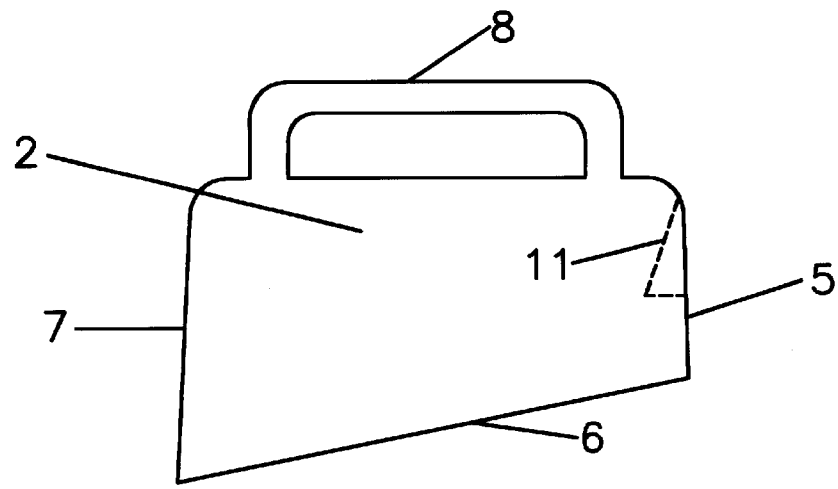
FIG. 4 is a side elevation view of the cylindrical container member and cylindrical top member separated to further illustrate detail.
Figure 4B:
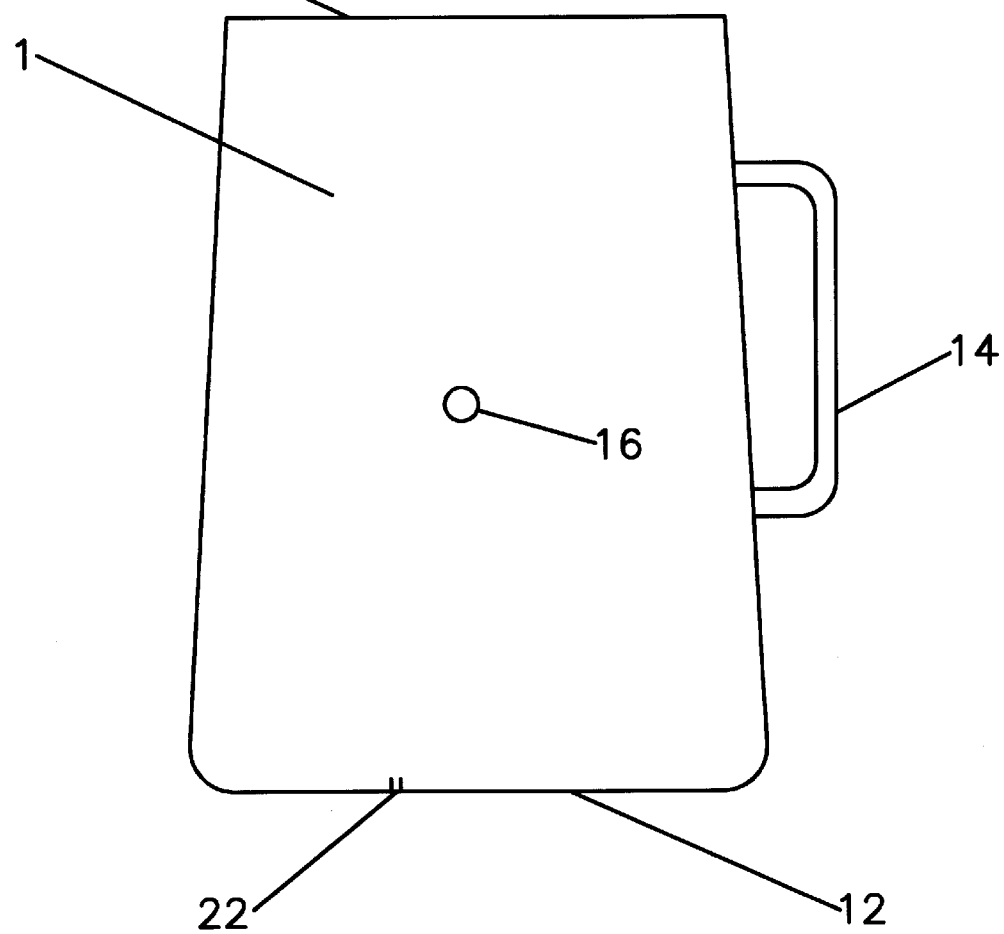

The cylindrical top member 2 has its open end 6 angled, with the front side 7 being longer than the back side 5 to better facilitate the catching of the commodities being poured from the container, as demonstrated in FIG. 3.

The holes 16 in the cylindrical storage container member 1 are directly opposite each other at a height at, or above the vertical center. In the preferred embodiment the cylindrical storage container member 1 is tapered, the volume and, therefore, the weight of the contents below the vertical center will always be greater than the volume and weight above the vertical center. The ability to raise or lower the holes 16 in the cylindrical storage container member 1 during manufacture, for different applications i.e. commodities stored, insure the stability of the device while maintaining the ability to tilt the cylindrical storage container member 1, to pour the contents, with minimum effort.

The handle 8 on the cylindrical top member 2, depending upon the design employed See FIG. 7, may function in a dual capacity. First, the handle 8 may be used to remove and replace the cylindrical top member 2 in relation to the cylindrical storage container member 1. Second, the handle 8 facilitates the placement of the open end 6 of the cylindrical top member 2 under the tilted cylindrical storage container member 1 for collection of the commodities. See FIG. 3. The handle 8 on the cylindrical top member 2 may be attached during assembly or may be integrated into the cylindrical top member 2 during the manufacturing process, i.e. molded if plastic, or stamped if metal.

The handle 14 attached to the cylindrical storage container 1 is used to draw, push or pull, the cylindrical storage container 1 upward to up end it and pour part of its contents into the cylindrical top member 2, FIG. 3. The tilt direction 17 of the cylindrical storage container 1 is reflected in FIG. 1. The handle 14 on the cylindrical storage container member 1 may be affixed to the device or may be integrated into the cylindrical storage container member 1 during the manufacturing process, i.e. molded if plastic or stamped if metal.

The cylindrical top member 2 has affixed, bolted, molded, or stamped, dependent on the method of manufacturing, a stopping device 11 which comes to rest on the open end 10 of the cylindrical storage container member 1 to prevent the cylindrical top member 2 from becoming locked onto the cylindrical storage container member 1 as a result of the close tolerances achieved through the matched and tapered sides of both the cylindrical storage container member 1 and the cylindrical top member 2.

Figure 5:
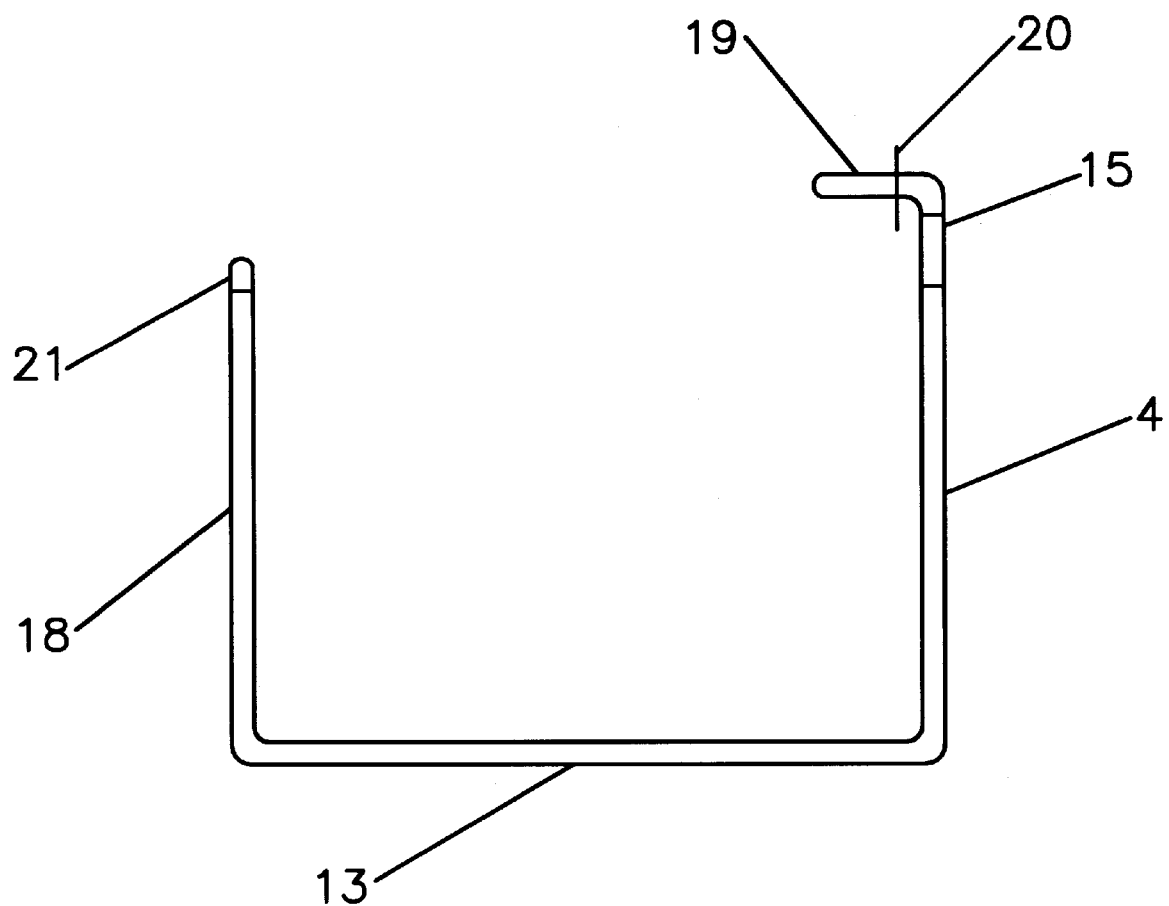
FIG. 5 is a front elevation view of stand leg.
Figure 6A:
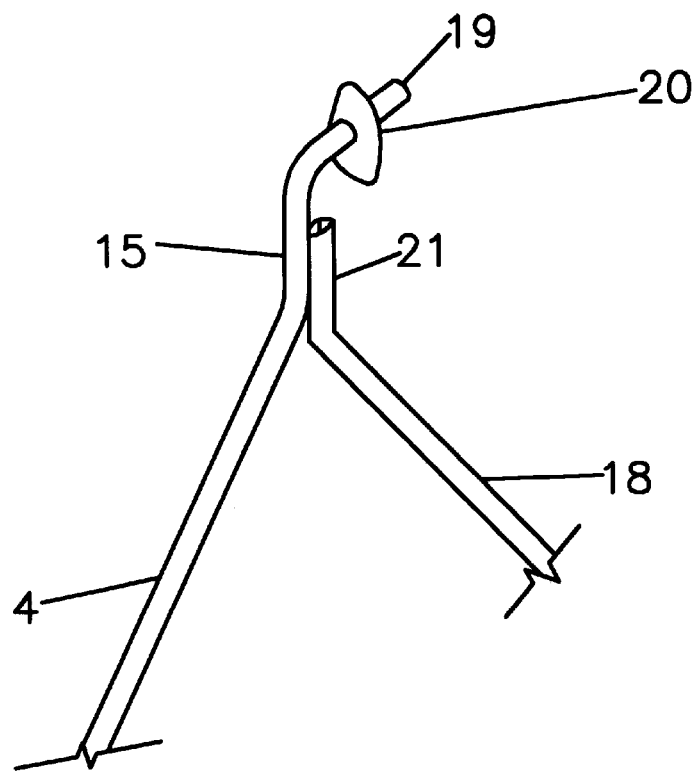
FIG. 6 is a perspective view of the stand member with an exploded view of the fastening and pivot arm segments to provide additional detail.
Figure 6B:
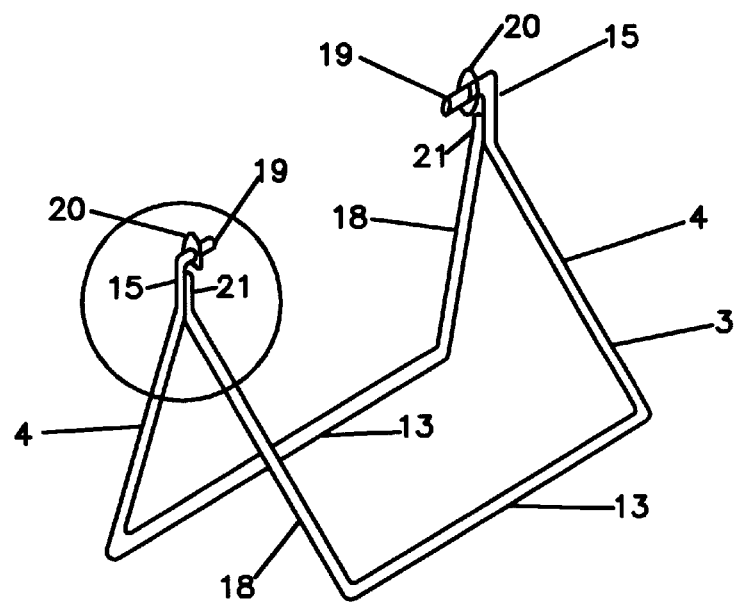

Referring now particularly to FIG. 5 and 6, the stand member 3. The stand member 3 is constructed from two pieces of metal rod. Each piece of rod when bent five times, as in the preferred embodiment, forms one leg of the two leg stand member 3. Each piece of rod, or leg, is identical, FIG. 5. When the two legs are joined, one leg is reversed, the first fastening segment 15 of the first leg is joined to the second fastening segment 21 of the second leg. FIG. 6 demonstrates the legs being reversed and the first fastening segment 15 of the first leg being joined to the second fastening segment 21 of the second leg. Additionally, the first fastening segment 15 of the second leg is joined to the second fastening segment 21 of the first leg. This process forms the stand member 3.

Because each rod is bent at least four times, in the preferred embodiment five times, the rod assumes unique characteristics and various segments are formed. Each rod, FIG. 5, after being bent into a leg, represents one pivot arm 19, a first fastening segment 15, a first side segment 4, a base segment 13, a second side segment 18, and a second fastening segment 21.

Suitable ground clearance, dependent upon the application, between the ground and the bottom 12 of the cylindrical storage container member 1 is adjusted by lengthening or shortening the the side segments 4 & 18 of the stand legs. Any adjustment to the length of the side segments 4 & 18 of the legs, effecting the height of the stand, will require an adjustment to the other bends of the leg which create the various segments.

To facilitate ease of tilting and parallel movement of the cylindrical storage container 1 through the side segments 4 & 18 of the stand 3, the pivot arms 19 of the stand 3 must intersect the container directly opposite from each other, and at a similar distance between the side segments 4 & 18 of the leg members. To maintain this distance spacers 20 are affixed to the pivot arms 19 which are part of the stand 3 and which are inserted into the holes 16 in the cylindrical storage container 1.

The pivot arms 19 which are inserted into the holes 16 in the cylindrical storage container member 1 can be fitted with optional bushings 9 if warranted by the application i.e. very heavy commodity or the device is to be tilted at a significant frequency. The thickness and strength of the container side walls is sufficient to withstand the weight of most anticipated commodities, and normal wear from the anticipated frequencies of tilting, without the bushings, and still to provide the user with a extended product life. Further the spacer 20 and optional bushings 9 may be incorporated into the pivot arm 19 or storage container member 1 if desired.

A hole 22 in the preferred embodiment may be positioned in the bottom 12 of the cylindrical container member 1 to provide drainage and ventilation for certain applications.

It is further understood that while one form of the machine has been illustrated and described, it is not be be limited thereto except insofar as such limitations are included in the claims.

We claim:

1. An apparatus for storing and retrieving commodities, comprising:
   a. a cylindrically-shaped container member having a closed bottom and an open end, the container member further having two holes opposite each other, the holes located above the vertical center of the container member; and
   b. a stand member comprising:
      i. a first rod which is bent at least four times to create a first leg, said first leg having a pivot arm;
      ii. a second rod which is bent at least four times to create a second leg, the second leg having a second pivot arm;
      iii. the first leg identical to the second leg;
      iv. the first leg connected to the second leg; and
      v. the first pivot arm and the second pivot arm inserted into an independent hole in the container member, the first pivot arm and the second pivot arm parallel to a base of the stand.

2. The apparatus as set forth in claim 1 wherein:
   the container member is a tapered cylinder, having a smaller diameter at its open end than at its closed bottom.

3. The apparatus as set forth in claim 1 wherein:
   the first pivot arm opposes the second pivot arm at 180 degrees.

4. The apparatus as set forth in claim 1 wherein:
   the height of the holes located on the container member can, during manufacture, be raised or lowered to change the horizontal axis and therefore the center of gravity of the container member.

5. The apparatus as set forth in claim 1 wherein:
   the container member and top member can be manufactured from metal or plastic.

6. The apparatus as set forth in claim 1 wherein a handle is connected to the container member.

7. The apparatus as set forth in claim 1 wherein:
   a plastic insert to line the inside of the container is used to protect the container from the commodity and facilitate the use of alternate commodities.

8. The apparatus as set forth in claim 1 wherein:
   a cylindrically-shaped top member having a closed end and an open end, the open end of the top member having a diameter greater than the diameter of the open end of the container member.

9. The apparatus as set forth in claim 8 wherein:

the sides of the open end of the container member are tapered, having a smaller diameter at its open end than at it closed bottom;

the cylindrically-shaped top member is tapered, having a smaller diameter at its closed end than at its open end, its diameters and tapered sides are matched to the diameters and tapered sides of the open end of the container member.

10. The apparatus as set forth in claim 8 wherein a handle is connected to the top member.

11. The apparatus as set forth in claim 1 wherein:

a cylindrically-shaped top member having a closed end and an open end, the open end having a diameter greater than the diameter of the open end of the container member, the top member having a height which enables the top member to be used as a catching device to collect a portion of the contents of the container member when the container member is tilted to a pour position.

12. The apparatus as set forth in claim 11 wherein:

the sides of the open end of the container member are tapered, having a smaller diameter at its open end than at it closed bottom;

the cylindrically-shaped top member is tapered, having a smaller diameter at its closed end than at its open end, its diameters and tapered sides are matched to the diameters and tapered sides of the open end of the container member.

13. The apparatus as set forth in claim 11 wherein:

a handle having a first end and a second end is connected to the top member, the first end of the handle connected to the closed end of the top member, the second end of the handle connected to a side of the top member creating a contour to facilitate holding and positioning the top member in place when it is employed as a catching device.

14. The apparatus as set forth in claim 1 wherein a cylindrically-shaped top member having a closed end and an open end, the open end of the top member having a diameter greater than the diameter of the open end of the container member, the top member having a height which enables the top member to be used as a catching device to collect a portion of the contents of the container member when said container member is tilted to a pour position, the top member being shaped like a scoop.

15. The apparatus as set forth in claim 14 wherein:

the sides of the open end of the container member are tapered, having a smaller diameter at its open end than at it closed bottom;

the cylindrically-shaped top member is tapered, having a smaller diameter at its closed end than at its open end, its diameters and tapered sides are matched to the diameters and tapered sides of the open end of the container member.

16. The apparatus as set forth in claim 14 wherein:

a handle having a first end and a second end is connected to the top member, the first end of the handle connected to the closed end of the top member, the second end of the handle connected to a side and back of the top member creating the contour to facilitate holding and positioning the top member in place when it is employed as a catching device.

17. The apparatus as set forth in claim 8, 11, or 14 wherein:

the top member can be manufactured from plastic or metal.

18. The apparatus as set forth in claim 8, 11, or 14 wherein:

a stopping device is connected to the top member to prevent the top member from being locked onto the container member.

19. An apparatus for storing and retrieving commodities, comprising:

a. a cylindrically-shaped container member having a closed bottom and an open end, the container member further having two holes opposite each other, the holes located above the vertical center of the container member; and b. a stand member comprising:

i. a first rod which is bent five times to create a first leg, a first bend creating a horizontal pivot arm and a first fastening segment, a second bend creating a first side segment, a third bend creating a base segment, a fourth bend creating a second side segment, and a fifth bend creating a second fastening segment;

ii. a second rod which is bent five times to create a second leg, a first bend creating a horizontal pivot arm and a first fastening segment, a second bend creating a first side segment, a third bend creating a base segment, a fourth bend creating a second side segment, and a fifth bend creating a second side segment;

iii. the first leg is identical to the second leg;

iv. the first fastening segment of the first leg connected to the second fastening segment of the second leg;

v. the second fastening segment of the first leg connected to the first fastening segment of the second leg; and vi. the pivot arm of each leg inserted into the holes in the container member, the pivot arms of both legs being parallel to a base of the stand member.

* * * * *